United States Patent [19]
Bednar

[11] Patent Number: 5,724,741
[45] Date of Patent: Mar. 10, 1998

[54] RECIPROCATING SAW WITH PIVOTING SHOE

[75] Inventor: Thomas R. Bednar, Pewaukee, Wis.

[73] Assignee: Milwaukee Electric Tool Corporation, Brookfield, Wis.

[21] Appl. No.: 613,590

[22] Filed: Mar. 12, 1996

[51] Int. Cl.$^6$ .................................................. B27B 19/02
[52] U.S. Cl. ................................................. 30/376; 30/392
[58] Field of Search ........................... 30/392–394, 373, 30/376, 293

[56] References Cited

U.S. PATENT DOCUMENTS

| | | | |
|---|---|---|---|
| 3,085,330 | 4/1963 | Lewinski et al. | 30/293 |
| 5,421,091 | 6/1995 | Gerritsen | 30/392 X |
| 5,450,925 | 9/1995 | Smith et al. | 30/393 X |

Primary Examiner—Douglas D. Watts
Attorney, Agent, or Firm—Michael, Best & Friedrich

[57] ABSTRACT

A reciprocating saw having a main body, a reciprocating spindle extending from the main body, and a saw blade connected to the spindle and including a cutting edge for cutting the workpiece. A shoe is pivotally mounted relative to the main body at a pivot axis, and a shoe support extends from the main body to pivotally support the shoe at the pivot axis. The pivot axis is substantially adjacent to the cutting edge such that the pivot axis moves through the workpiece at substantially the same time as the cutting edge. The shoe support includes a post connected to and extending from the body, and a yoke connected to the post, the yoke including two leg portions pivotally connected to the shoe. The shoe is pivotally mounted at a pivot part that is recessed inwardly from a side guide surface. The shoe includes an indicator in alignment with the saw blade to facilitate alignment of the saw blade with a mark on the workpiece.

16 Claims, 2 Drawing Sheets

RECIPROCATING SAW WITH PIVOTING SHOE

FIELD OF THE INVENTION

The present invention generally relates to the field of reciprocating saws and, more specifically, to reciprocating saws having shoes.

BACKGROUND OF THE INVENTION

Reciprocating saws (e.g., sabre saws or compass saws) include a main body, a reciprocating spindle extending from the main body, and a saw blade connected to the spindle. Some reciprocating saws further include a shoe secured relative to the main body to provide a flat surface for resting against the workpiece during cutting operations. The shoe is positioned near the saw blade, and the flat surface is usually perpendicular to the saw blade. The shoe typically includes an opening through which the blade extends.

In some reciprocating saws, the shoe is pivotally mounted relative to the main body. A pivoting shoe allows the blade to be positioned at a range of angles relative to the workpiece. The pivoting shoes are commonly pivotally attached by rivets to a shoe support that extends from the main body beneath the saw blade. For example, in one design, the shoe support pivotally engages the shoe utilizing a through-bolt extending between two laterally-spaced locations on opposing sides of the shoe. The pivot point of these shoe supports is positioned an inch or more below the cutting surface of the saw blade.

SUMMARY OF THE INVENTION

One problem with the above-described reciprocating saw is that the shoe support can obstruct the user's view of the saw blade cutting the workpiece. This can be a problem when the user is attempting to follow a mark on the workpiece. Another problem with some reciprocating saws is that the opening in the shoe can fill with sawdust when cutting a horizontal surface. This condition can obstruct the user's view of the workpiece, which limits the user's ability to follow a mark on the workpiece. Yet another problem is that the rivets used to pivotally attach the shoe to the shoe support can extend laterally outward beyond the sides of the shoe, thereby providing an uneven surface that is not suitable for guiding the saw along a guide.

The location of the pivot point below the cutting edge of the saw blade can provide an unstable shoe in certain situations. More specifically, as the end of a workpiece is approached during a downward cut, the shoe pivot point will fall off the end of the workpiece before the saw blade completes the cut. In this situation, the lower end of the shoe has a tendency to pivot away from the operator and the upper end of the shoe moves toward the saw operator, thereby potentially disrupting the stability of the saw relative to the workpiece.

The present invention alleviates one or more of the above-noted problems by providing a reciprocating saw having a main body, a reciprocating spindle extending from the main body, and a saw blade connected to the spindle and including a cutting edge for cutting the workpiece. A shoe is pivotally mounted relative to the main body at a pivot axis which extends transverse to the direction of reciprocation of the saw, and a shoe support extends from the main body to pivotally support the shoe at the pivot axis. The pivot axis is substantially adjacent to the cutting edge such that the pivot axis moves through the workpiece at substantially the same time as the cutting edge. The shoe support includes a post connected to and extending from the body, and a yoke connected to the post, the yoke including two leg portions pivotally connected to the shoe.

Preferably, the pivot axis substantially intersects the cutting edge. By virtue of this arrangement, the shoe will remain more stable against the face of the workpiece until the saw blade completes the cut through the workpiece. Further, the two leg portions preferably define a yoke opening for providing visual access to the saw blade. The post can be axially adjustably connected to the main body along a support axis, wherein the pivot axis is between the support axis and the cutting edge.

In another aspect, the present invention provides a reciprocating saw including a main body, a reciprocating spindle extending from the main body, a saw blade connected to the spindle, and a shoe pivotally interconnected to the main body. The shoe includes at least one side portion defining a guide surface (e.g., a planar guide surface). The shoe is pivotally mounted at a pivot part of the side portion that is recessed inwardly from the guide surface. Preferably, the shoe includes two laterally-opposed side portions defining corresponding guide surfaces, and the shoe is pivotally mounted at recessed pivot parts of each side portion. By virtue of this aspect of the invention, the pivot point will not interfere with using the side portions of the shoe as a guide surface for guiding the cutting operation.

In yet another aspect, the present invention provides a reciprocating saw including a main body, a reciprocating spindle extending from the main body, a saw blade connected to the spindle and including a cutting edge for cutting the workpiece, and a shoe pivotally interconnected to the body. In accordance with the invention, the shoe includes an indicator in alignment with the saw blade. In one embodiment, the indicator includes V-shaped portion of an opening in the shoe, and preferably includes a front V-shaped portion at a front of the opening adjacent the cutting edge and a rear V-shaped opening at a rear of the opening opposite the cutting edge. The indicator could also include a notch in the shoe (e.g., a notch in each of the front and rear walls of the shoe). By virtue of this aspect of the invention, the indicator can be aligned with a marking on the workpiece, thereby facilitating cutting along the marking without the need to see the blade in contact with the workpiece.

DETAILED DESCRIPTION

Figure 1:
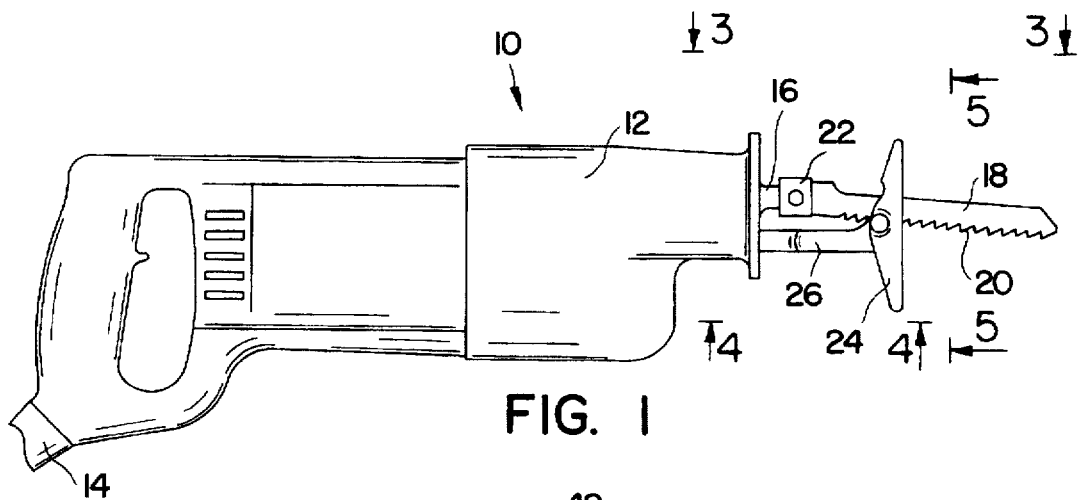
FIG. 1 is a side view of a reciprocating saw embodying the present invention.
Figure 2:
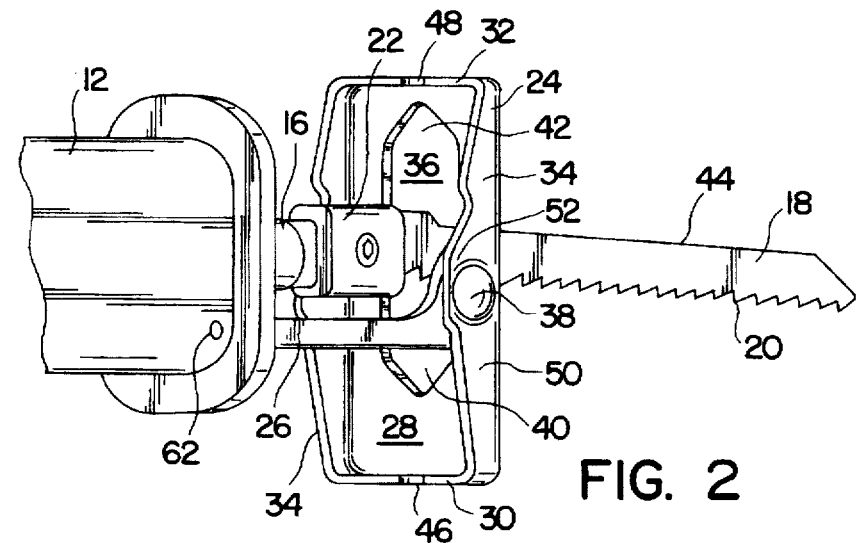
FIG. 2 is an enlarged perspective view of one end of the reciprocating saw illustrated in FIG. 1.

FIGS. 1–6 illustrate a reciprocating saw 10 embodying the present invention. The reciprocating saw 10 generally includes a main body 12 having an electric motor (not shown) provided with power via an electric cord 14. The electric motor provides reciprocating motion to a reciprocating spindle 16 by a mechanical arrangement (not shown) similar to that disclosed in U.S. Pat. No. 5,050,307, which is incorporated herein by reference. A saw blade 18, having a cutting edge 20, is secured to the end of the reciprocating spindle 16 by a collar and set screw arrangement 22. A shoe 24 is pivotally connected to a shoe support 26 that extends from the main body 12.

The illustrated shoe 24 includes a base portion 28, a front wall 30, a rear wall 32 and two side walls 34. The base portion 28 includes a shoe opening 36 through which the saw blade 18 extends. The side walls 34 are pivotally connected to the shoe support 26 by rivets 38, which define a pivot axis 39 (FIG. 3), as described below in more detail.

The shoe 24 includes several indicators in alignment with the saw blade 18 to provide a visual indication of the saw blade 18 with respect to the workpiece. For example, to cut along a marking on the workpiece, the user can maintain the indicators in alignment with the marking to thereby ensure that the saw blade 18 is generally following the marking. One set of indicators includes a front V-shaped portion 40 of the shoe opening 36 and a rear V-shaped portion 42 of the shoe opening 36, each of which is in alignment with the saw blade 18. More specifically, the front V-shaped portion 40 is aligned with the cutting edge 20 of the saw blade 18 and the rear V-shaped portion 42 is aligned with the opposite edge 44 of the saw blade 18.

As another set of indicators, the shoe 24 includes a front notch 46 formed in the front wall 30 of the shoe 24 and a rear notch 48 formed in a rear wall 32 of the shoe 24. Both the front notch 46 and the rear notch 48 are in alignment with the saw blade 18. That is, the front notch 46 is aligned with the cutting edge 20, and the rear notch 48 is aligned with the opposite edge 44. The front and rear notches 46,48 are advantageous in that they provide a visual indication of the position of the saw blade 18. This is particularly helpful when visual access to the saw blade 18 and the shoe opening 36 is impaired, such as when the shoe opening 36 is filled with debris (e.g., saw dust).

Figure 7:
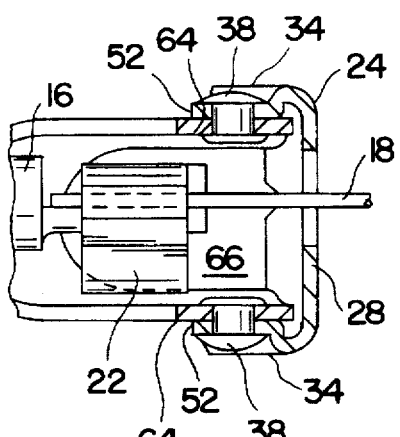
FIG. 7 is a section view taken along line 7—7 in FIG. 6.
Figure 5:
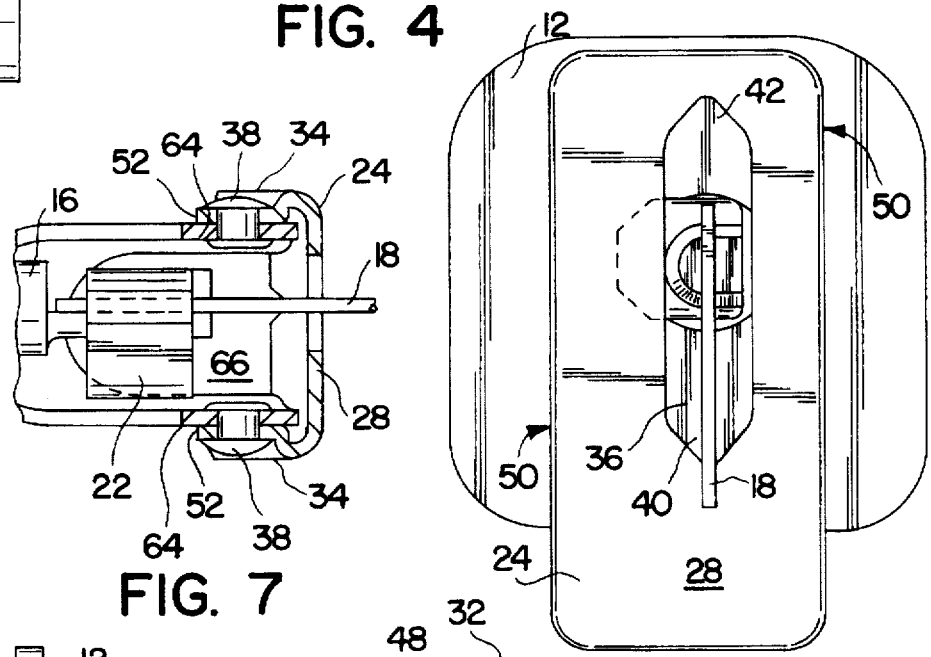
FIG. 5 is a bottom view of the reciprocating saw taken along line 5—5 in FIG. 1.

The shoe 24 further includes two side portions that define a guide surface. In the illustrated embodiment, the side portions include the side walls 34 that extend upwardly from the base portion 28, and which define a substantially planar guide surface 50 for guiding the shoe 24 along a guide (not shown). The side walls 34 each include a mounting portion 52 through which the rivet 38 is inserted to pivotally mount the shoe 24 to the shoe support 26. As best shown in FIG. 7, the mounting portion 52 is recessed inwardly from the guide surface 50 toward the shoe opening 36 so that the head of the rivet 38 does not extend outwardly beyond the guide surface 50. This arrangement prevents a non-uniformity of the guide surface 50. It can be seen that, if the rivet 38 was to extend beyond the guide surface 50, the planar guide surface would not be flush with a planar guide, but rather would rock along the head of the rivet 38 thereby creating an instability of the shoe 24.

Figure 3:
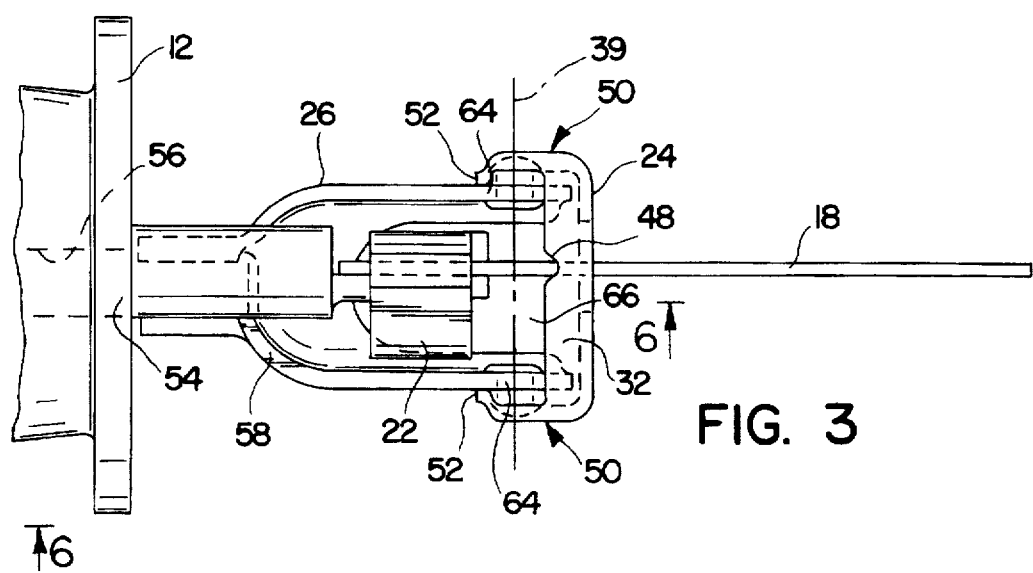
FIG. 3 is an enlarged partial plan view of the reciprocating saw and taken along line 3—3 in FIG. 1.
Figure 4:
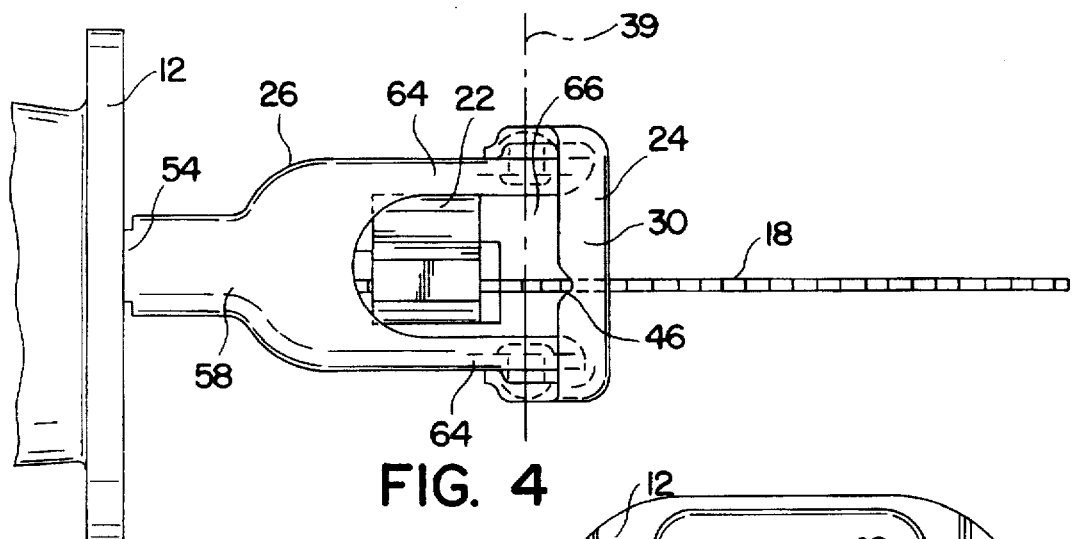
FIG. 4 is an enlarged partial plan view of the reciprocating saw and taken along line 4—4 in FIG. 1.

Referring to FIGS. 3 and 4, the shoe support 26 includes a longitudinally-extending post 54 at least partially positioned within an orifice 56 in the main body 12, and a yoke 58 connected (e.g., welded) to the post. The post 54 is moveable axially relative to the main body 12 along a support axis 60, and is selectively securable relative to the main body 12 by a set screw 62 accessible from the side of the main body 12. The yoke 58 includes two leg portions 64 extending axially away from the main body 12. The leg portions 64 are laterally spaced from each other to form a yoke opening 66 therebetween. The ends of the leg portions 64 are pivotally secured to the shoe 24 by the previously-described rivets 38. By virtue of the yoke opening 66, access (both visual and physical) to the saw blade 18 is enhanced, particularly at the location where the saw blade 18 is cutting a workpiece.

Figure 6:
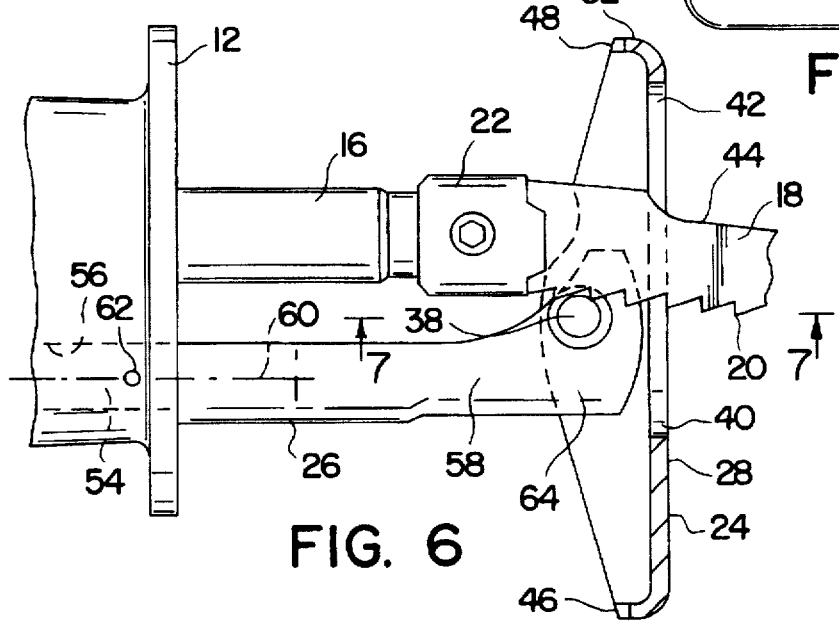
FIG. 6 is a section view taken along line 6—6 in FIG. 3.

Referring to FIGS. 1 and 6, the pivot axis 39 defined by the pivotal connection between the shoe 24 and the shoe support 26 is positioned to be substantially adjacent to the cutting edge 20 of the saw blade 18 such that the pivot axis 39 moves through the work piece at substantially the same time as the cutting edge 20. It should be appreciates that, because the cutting edge 20 is oblique to the reciprocating motion of the saw blade 18, the position of the cutting edge 20 relative to the pivot axis 39 changes somewhat during the reciprocating motion of the saw blade 18. Furthermore, because the cutting edge 20 is oblique to the support axis 60, adjustment of the shoe support 26 will also change the positional relationship between the pivot axis 39 and the cutting edge 20. In the illustrated embodiment, when the shoe support 26 is fully retracted (i.e., closest to the main body 12) and the saw blade 18 is fully extended (i.e., away from the main body 12), the pivot axis 39 is about 2 mm below the cutting edge 20, as shown in FIG. 7. Conversely, with both the shoe support 26 and the reciprocating spindle 16 fully retracted, the pivot axis 39 is substantially aligned (i.e., substantially intersects) with the cutting edge 20, as shown in FIG. 1.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A reciprocating saw for cutting a workpiece, said saw comprising:

a main body;

a reciprocating spindle extending from said main body;

a saw blade connected to said spindle and including a cutting edge for cutting the workpiece;

a shoe pivotally mounted relative to said main body at a pivot axis; and a shoe support extending from said main body and pivotally supporting said shoe at said pivot axis, said pivot axis being substantially adjacent to said cutting edge such that said pivot axis moves through the workpiece at substantially the same time as said cutting edge.

2. A reciprocating saw as claimed in claim 1, wherein said pivot axis intersects said cutting edge.

3. A reciprocating saw as claimed in claim 1, wherein said shoe includes at least one side portion defining a guide surface, and wherein said shoe is pivotally mounted at a mounting portion of said side portion, said mounting portion being recessed inwardly from said guide surface.

4. A reciprocating saw as claimed in claim 3, wherein said guide surface is substantially planar.

5. A reciprocating saw as claimed in claim 1, wherein said shoe includes an indicator in alignment with said saw blade.

6. A reciprocating saw as claimed in claim 5, wherein said shoe includes an opening through which said saw blade extends, and wherein said indicator includes a V-shaped portion of said opening.

7. A reciprocating saw as claimed in claim 5, wherein said indicator includes a notch in said shoe.

8. A reciprocating saw as claimed in claim 1, wherein said shoe support includes a yoke having two leg portions pivotally connected to said shoe, and wherein said two leg portions define a yoke opening for providing visual access to said saw blade.

9. A reciprocating saw as claimed in claim 1, wherein said shoe support includes:

a post connected to and extending from said body; and a yoke connected to said post, said yoke including two leg portions pivotally connected to said shoe;

and wherein said post is axially adjustably connected to said main body along a support axis.

10. A reciprocating saw as claimed in claim 9, wherein said pivot axis is between said support axis and said cutting edge.

11. A reciprocating saw for cutting a workpiece, said saw comprising:

a main body;

a reciprocating spindle extending from said main body;

a saw blade connected to said spindle; and a shoe pivotally interconnected to said main body, wherein said shoe includes at least one side portion defining a guide surface, and wherein said shoe is pivotally mounted at a mounting portion of said side portion, said mounting portion being recessed inwardly from said guide surface.

12. A reciprocating saw as claimed in claim 11, wherein said guide surface is substantially planar.

13. A reciprocating saw as claimed in claim 11, wherein said shoe includes two laterally-opposed side portions defining corresponding guide surfaces, and wherein said shoe is pivotally mounted at mounting portions of each said side portion, each said mounting portion being recessed inwardly from said corresponding guide surface.

14. A reciprocating saw for cutting a workpiece, said saw comprising:

a main body;

a reciprocating spindle extending from said main body;

a saw blade connected to said spindle; and a shoe pivotally interconnected to said body and having an opening through which said saw blade extends, said shoe including an indicator in alignment with said saw blade, wherein said indicator includes a V-shaped portion of said opening.

15. A reciprocating saw as claimed in claim 14, wherein said indicator includes a front V-shaped portion at a front of said opening adjacent said cutting edge and a rear V-shaped portion at a rear of said opening opposite said cutting edge.

16. A reciprocating saw for cutting a workpiece, said saw comprising:

a main body;

a reciprocating spindle extending from said main body;

a saw blade connected to said spindle; and a shoe pivotally interconnected to said body, said shoe including:

a base having front and rear edges;

a front wall extending upwardly from said front edge; and a rear wall extending upwardly from said rear edge, wherein each of said front wall and said rear wall includes an indicator notch in alignment with said saw blade.

\* \* \* \* \*